United States Patent
Just et al.

(10) Patent No.: US 8,361,219 B2
(45) Date of Patent: Jan. 29, 2013

(54) AIR-CURING EXPANDED CONCRETE COMPOSED OF BINDER-CONTAINING MIXTURES

(75) Inventors: Armin Just, Dortmund (DE); Bernhard Middendorf, Calden (DE); Juergen Neisecke, Dortmund (DE)

(73) Assignee: Universitaet Dortmund, Dortmund (DE)

(*) Notice: Subject to any disclaimer, the term of this patent is extended or adjusted under 35 U.S.C. 154(b) by 176 days.

(21) Appl. No.: 12/311,198

(22) PCT Filed: Jul. 24, 2007

(86) PCT No.: PCT/DE2007/001312
§ 371 (c)(1),
(2), (4) Date: May 26, 2009

(87) PCT Pub. No.: WO2008/034403
PCT Pub. Date: Mar. 27, 2008

(65) Prior Publication Data
US 2010/0000346 A1    Jan. 7, 2010

(30) Foreign Application Priority Data
Sep. 21, 2006 (DE) .................. 10 2006 045 091

(51) Int. Cl.
C04B 18/06 (2006.01)
(52) U.S. Cl. ........ 106/672; 106/679; 106/705; 106/713; 106/737; 106/789; 106/DIG. 1
(58) Field of Classification Search .................. 106/713, 106/705, DIG. 1, 672, 679, 737, 789
See application file for complete search history.

(56) References Cited

U.S. PATENT DOCUMENTS 3,211,675 A * 10/1965 Johnson .................. 521/100
4,233,080 A * 11/1980 Koeppel .................. 524/5
(Continued)

FOREIGN PATENT DOCUMENTS

AT    266 673    11/1968
CN    1 261 600    8/2000
(Continued)

OTHER PUBLICATIONS

RU 2283293 C1 (Sep. 10, 2006) Smirenskaya et al. abstract only.*
(Continued)

Primary Examiner — Paul Marcantoni
(74) Attorney, Agent, or Firm — Collard & Roe, P.C.

(57) ABSTRACT

The invention relates to an expanded concrete composed of binder-containing mixtures, preferably having binders composed of Portland cement as specified in DIN EN 197 or of mixtures of hydraulic, latent-hydraulic and/or pozzolanic binders, having binders, water with a fraction of 20-60% by mass based on the mass of the binder in the mixture, chemical gas-forming agent, preferably in the form of aluminum powder, at 0.05-0.25% by mass, based on the mass of the binder, for forming mostly air pores in the expanded concrete, wherein the gas-forming agent in the form of a powder forms a mixture of different particle sizes, concrete additives such as in particular microsilica and/or flyash with a fraction of 0.5-25% by mass, based on the mass of the binder, concrete admixtures of mostly liquefying character and at a fraction of 0.5-5% by mass, based on the mass of the binder, wherein the distribution of the air pores of different sizes in the matrix of the expanded concrete, depending on its consistency, makes possible a compressive strength up to 30 N/mm$^2$ after curing, and the expanded concrete is air-curing at atmospheric pressure under normal ambient temperature. In addition, a method is proposed of producing such an expanded concrete, and also a test method of determining the fresh concrete properties of an expanded concrete according to the invention.

15 Claims, 2 Drawing Sheets

U.S. PATENT DOCUMENTS

| | | | |
|---|---|---|---|
| 6,203,609 B1 * | 3/2001 | Castro et al. | 106/705 |
| 6,569,232 B2 * | 5/2003 | Castro et al. | 106/644 |
| 2002/0117086 A1 * | 8/2002 | Shi et al. | 106/672 |
| 2004/0149170 A1 * | 8/2004 | Moran | 106/672 |
| 2006/0177368 A1 | 8/2006 | Frey et al. | |

FOREIGN PATENT DOCUMENTS

| | | |
|---|---|---|
| DE | 10 2005 005 259 | 8/2006 |
| EP | 0 690 034 | 1/1996 |
| EP | 1 050 521 | 11/2000 |
| GB | 1147992 | 10/1969 |
| GR | 1 003 397 | 7/2000 |
| RU | 2 073 661 | 2/1997 |
| SU | 365 339 | 1/1973 |
| SU | 1 491 857 | 7/1989 |

OTHER PUBLICATIONS

RU 2209801 C1 (Aug. 10, 2003) Lotov et al. abstract only.*

RU 2283293 C1 (Sep. 1, 2006) Dolotova et al. abstract only.*

Bokova, L. I., "Naturally hardened aerated ash concrete for monolithic house construction," Chemical Abstracts, vol. 118, No. 20, May 1993, Abstract No. 196795, p. 327. XP-000472124. (ISR).

Fedynin, N. I., "Manufacture of unautoclaved aerated ash concrete with increased strength and durability," Chemical Abstracts, vol. 114, No. 26, Jul. 1991, Abstract No. 252703, p. 344. XP-000194882. (ISR).

English translation of the International Preliminary Report on Patentability and Written Opinion of the International Searching Authority.

DIN 55 923, 1983, pp. 1-7. (Spec, p. 3).

DIN EN 992, 1995, pp. 1 and 1-3. (Spec, p. 4).

DIN EN 1351, 1997, pp. 1 and 1-7. (Spec, p. 4).

DIN EN 1352, 1996, pp. 1 and 1-5. (Spec, p. 4).

DIN EN 1354, 2005, pp. 1-18. (Spec, p. 4).

DIN EN 12350-5, 1999, pp. 1-2 and 1-5. (Spec, p. 16).

DIN 1045-2, 2001, pp. 1-48. (Spec, pp. 15-16, 19, claim 3 and claim 14).

DIN 1053-1, 1996, pp. 1-32. (Spec, p. 10).

DIN EN 197-1, 2000 and 2004, pp. 1-32. (Spec, p. 11 and claim 1).

DIN 4164, Oct. 1951, Preisgr. 2, Univ.-Bibl. Dortmund, pp. 1-2. (Spec, p. 4).

* cited by examiner

AIR-CURING EXPANDED CONCRETE COMPOSED OF BINDER-CONTAINING MIXTURES

CROSS REFERENCE TO RELATED APPLICATIONS

This application is the National Stage of PCT/DE2007/001312 filed on Jul. 24, 2007, which claims priority under 35 U.S.C. §119 of German Application No. 10 2006 045 091.4 filed on Sep. 21, 2006. The international application under PCT article 21(2) was not published in English.

The invention relates to an expanded concrete composed of binder-containing mixtures, in accordance with the preamble of claim 1.

Mineral foams, as construction materials very frequently used in housing construction, for example, combine many properties of conventional concrete with improved heat insulation properties, light weight, and good workability of the pre-finished components, which can be adapted to the final shapes required, in each instance, simply by means of sawing, for example. However, it is a disadvantage that the production of typical expanded concretes can take place only in corresponding factories, since hardening of the components after shaping must take place at elevated pressure and elevated temperature, in autoclaves. A further disadvantage is the strength properties, which are lower as compared with normal concrete, and set design limits for the use of such expanded concrete.

In the production of mineral-bonded foams, the main concern is to produce foams, usually cement-bonded foams, which possess the desired physical and mechanical properties. There are different ways to achieve this, which result in different properties of the expanded concretes produced in this way, as the result of different process management.

Light concretes having a pore matrix can fundamentally be divided into two different classes, which reflect the main production methods, in each instance, namely
  production by means of chemical expansion, and
  production by means of physical foaming.

In the case of expanded concrete produced by means of chemical expansion, the pores are formed by means of chemical reaction of a gas-producing propellant with the binder and water.

Formerly, pore development was achieved by means of the use of calcium carbide, with subsequent acetylene gas development, or by means of hydrogen peroxide and chlorinated lime, with oxygen development. Nowadays, aluminum is used, almost exclusively, as a propellant; it achieves a propellant effect by means of the formation of hydrogen. In the mixtures used, fine-grain aluminum (Al), calcium hydroxide $(Ca(OH)_2)$ from the binder and water react with one another. During the redox reaction, hydrogen is formed, which expands the mixture and provides for pore formation.

The reaction for hydrogen formation runs as follows:

The hydrogen already diffuses out of the concrete during the production process, and subsequently, there is only air in the pores.

The aluminum additives are used in powder form or as a paste dispersion. The degree of fineness of the aluminum pigments can be described by the coverage area according to DIN 55923. Coverage areas on the order of 12,000 to 20,000 $[cm^2/g]$ are assumed.

The gas formation process can be controlled by means of the grain size distribution of the aluminum powder. The volume of each grain influences the amount of hydrogen that forms. Furthermore, the reaction time is dependent on the grain shape, since different shapes also possess different specific surfaces and thus reaction surfaces.

The production method has become the usual one for the production of pre-finished parts made of expanded concrete. In order to achieve greater strength values and reduce the tendency to shrink, the pre-finished parts made of expanded concrete are generally hardened in steam, under pressure (e.g. 190° C., 12 bar). Because of the steam pressure hardening, use is generally restricted to components manufactured industrially, in stationary manner. The use of these components is standardized in various regulations (DIN 4164, DIN EN 992, DIN EN 1351, DIN EN 1352, DIN EN 1354).

In the case of expanded concrete, reinforced and non-reinforced components are possible. Reinforcement requires separate corrosion protection due to the high diffusion openness of the porous construction material.

The following should be mentioned as properties and advantages of the expanded concrete construction systems:
  Low weight: The components are easy to work on and easy to handle; furthermore, they have good insulation properties.
  Good workability: The components can be cut to size without great mechanical effort. They are easy to saw and can be nailed or doweled for attachment in installations.
  Accurate fit: The use of thin-bed mortar for horizontal joints and tongue and groove systems for butt joints reduces heat bridges in comparison with conventional masonry mortar joints.

Expanded concrete is suitable for the following areas of use, for example:
  large-format masonry work,
  wall and ceiling panels,
  reinforced components for skeleton constructions.

In the case of light expanded concrete/foamed concrete, production takes place by means of physical foaming, and the pores are formed mechanically, either by stirring an aqueous air foam that has been separately pre-finished into a mortar, or by stirring in air, in the mixer, after addition of a surfactant foam or air pore forming agent. For this purpose, surfactants whose ambiphilic properties are being utilized are generally used. An important criterion in this regard is the stability of the foam produced. Another method is the gasification of cement paste or mortar. Light expanded concrete is also called foamed concrete, because of the separate foam production.

The production of a foam from a foam forming agent and water is practicable using a foaming device, and can also take place directly at the construction site. Stable foams can be produced, which can be mixed well with the fresh concrete. The light expanded concrete is produced in a consistency that is capable of flow and can be pumped, since more viscous consistencies would lead to a reduction in the foam component, and thus the pore structure would be destroyed. Because of this consistency, the light expanded concrete is self-leveling, to a great extent, and achieves cavities that are difficult to access, even without compaction. In comparison with grainy fill material, the light expanded concrete is subsidence-free.

For light expanded concrete, there are currently the following areas of use, for example:
  Restoration of two-layer masonry of historic buildings
  Light expanded concrete is used to fill cavities of all kinds. Applications that can be mentioned are filling ditches in pipeline construction, filling cavities of sewer lines or tanks that have been shut down, or also stabilization of roads, for example, after undermining as the result of heavy precipitation.

Light expanded concrete can be used for substructures in road construction, and contributes, with little weight, to ensuring that less subsidence occurs, particularly in the case of soft subsoils.

In earthworks, it is used for stabilization measures or load distribution. In this connection, the high flowability and the sufficient strength are utilized, so that here—in contrast to conventional fills—it is possible to work without vibrations, without additional compaction.

Production of heat insulation in the roof area, for example in the case of flat roofs having an incline and a predetermined compressive strength, which can therefore be walked on and driven on, while simultaneously reducing weight.

In general, hardening takes place under atmospheric pressure, at ambient temperature, by means of hydration of the binder, cement.

The versatility of light expanded concrete is shown by a range of density values that can be adjusted, and is limited by technological limits that have an effect on the strength or denseness of the concrete, among other things.

In this connection, the properties of cement-bonded mineral foams are primarily determined by their composition and their processing.

The expanded concrete that is produced in factories nowadays is usually produced from a mixture of lime, cement with quartz sand, and water, using a pore forming agent or foam forming agent. It has a relatively low raw density as compared with normal concrete, because of its numerous pores. The other construction-related physical properties also differ significantly from those of normal concrete. The following is a comparison of expanded concrete and normal concrete, whereby a listing of the properties of foamed concrete is not included at this point, since the strength values, modulus of elasticity, etc., exclude its use as a construction material.

The raw density of expanded concrete lies between 0.30 to 1.00 kg/dm$^3$ (normal concrete: approximately 2.4 kg/dm$^3$).

The modulus of elasticity for expanded concrete lies between 12,000 to 25,000 N/mm$^2$, as a function of the raw density, in each instance (normal concrete: >30,000 N/mm$^2$).

The compressive strength of expanded concrete amounts to approximately 2.5 to 10.0 N/mm$^2$ (normal concrete: generally >20 N/mm$^2$).

The centric tensile strength of expanded concrete and of normal concrete is only approximately 10% of the compressive strength.

The heat conductivity of the expanded concrete is comparatively very low. It lies at approximately 0.11 to 0.29 W/(m K), as a function of the raw density (normal concrete: 2.10 W/(m K)).

The thermal expansion of the expanded concrete amounts to about 0.008 mm/(m K) in a temperature interval from 20 degrees to 100 degrees Celsius ($\alpha_{tb}$ is approximately the same as for normal concrete, since the material is the same) (normal concrete: $\alpha_{tb}$=10$^5$ K).

The calculated value of the degree of shrinkage has been established at 0.2 mm/m, according to DIN 1053 Part 1 (normal concrete: 2.28 to 0.60 mm/m).

The expanded concretes and light expanded concretes are characterized as good heat insulation materials, because of their porous structure. Because of their mineral composition, they are not combustible.

It is true that the air-curing foamed concretes that are in use nowadays can be mixed directly at the construction site, but they are very limited in terms of their properties, and cannot be used as a construction material because of their low strength values. It is true that expanded concretes cured in an autoclave guarantee higher strength values, but they can only be produced in specific expanded concrete plants, in autoclaves, in stationary manner. Production in conventional plants for pre-finished concrete parts or even on the construction site is excluded.

It is therefore the task of the present invention to further develop an expanded concrete in such a manner that it has not only the advantageous properties of known expanded concretes, such as heat insulation, raw density, etc., but also, in particular, improved stressability values, and therefore can also be used in construction in areas in which expanded concretes could not be used, particularly also for production at the construction site.

The solution for the task according to the invention results from the characterizing features of claim 1 with regard to an expanded concrete, and from the characterizing features of claim 14 with regard to a method for the production of such an expanded concrete, in interaction with the characteristics of the preamble. Other advantageous embodiments of the invention result from the dependent claims.

The invention proceeds from an expanded concrete composed of binder-containing mixtures, preferably having binders composed of Portland cement according to DIN EN 197 or of mixtures of binders that bind in a hydraulic, latently hydraulic and/or puzzolanic reaction. Such an expanded concrete has binders,
  water in a proportion of 20-60 mass-% with reference to the mass of the binder in the mixture,
  chemical propellant, preferably in the form of aluminum powder, at 0.05-0.25 mass-% with reference to the mass of the binder, for the formation of air pores, predominantly, in the expanded concrete, whereby the propellant forms a mixture of different particle sizes, in the form of a powder,
  concrete additives such as, in particular, microsilica, ground slag sand and/or fly ash, in a proportion of 0.5 to 25 mass-% with reference to the mass of the binder,
  concrete admixtures with a predominantly liquefying character and a proportion of 0.05-5 mass-% with reference to the mass of the binder,
whereby the distribution of the air pores of different sizes in the matrix of the expanded concrete allows a compressive strength of up to 30 N/mm$^2$ after curing, as a function of its consistency, and the expanded concrete cures in air, under atmospheric pressure, at normal ambient temperature.

Such an expanded concrete represents a new type of construction material that guarantees great strength and, simultaneously, a low specific inherent weight. This material furthermore has very good heat insulation properties, is permanently moisture-resistant, and is not inflammable or combustible. It combines chemical expansion of a mineral-bonded binder paste with subsequent hardening under atmospheric pressure, at normal temperature, by means of hydration of the cement as the binder. These results are essentially achieved by means of two measures.

The strength of the expanded concrete is optimized by means of a targeted air pore distribution. This optimization is adjusted by way of the amount of propellant added, particularly aluminum powder, and its particle size, as well as by way of the fresh mortar consistency. If, in particular, the propellant is present completely dispersed in the batch-up water, then each propellant particle is also responsible for the formation of one air pore. If propellant particles having different particle sizes are used, in this connection, and intimately mixed with one another and with the other components of the expanded concrete, then a very uniform and dense distribution of the air pores in the matrix of the expanded concrete occurs, which allows a significant improvement of the strength values of the expanded concrete, while keeping the raw density of the expanded concrete the same. The diameter of a pore is influenced not only by the mass of the reacting propellant particle, but also by the fresh mortar consistency. A low viscosity of the fresh mortar leads to lower pore diameters, while a high viscosity leads to greater ones, accordingly. If the viscosity becomes too high, there is the risk of demixing. The air pores then rise to the surface. Thus, there are many possibilities for influencing the pore distribution and pore size, in targeted manner, by way of the particle size of the propellants and their number and distribution in the fresh expanded concrete.

Furthermore, in addition to this optimization of the pore distribution of the expanded concrete, the compressive strength and the modulus of elasticity of the expanded concretes that can already be produced nowadays are far exceeded by means of targeted optimization of the cement block matrix. Optimization of the matrix of the cement block can be achieved by means of working in the concrete additives indicated, or also additional ones, which make it possible to vary the properties of the cement block matrix, depending on the case of use. The structure of this cement block matrix is improved by way of a reduced water/cement ratio and by means of the use of concrete admixtures (e.g. concrete liquefier) and concrete additives (e.g. microsilica). For this, the same approaches apply as those that have already been researched or are currently being researched for high-strength and ultra-high-strength concretes (HPC and UHPC).

Thus, construction materials can be produced that possess a compressive strength of up to 30.0 N/mm$^2$ and, at the same time, do not exceed a raw density of 1.0 g/cm$^3$. The advantages of the invention lie, for one thing, in the fact that production of the construction material is not tied to a specific location (plant for pre-finished concrete parts, construction site) and, for another, in the improvement in the physical and mechanical properties of the hardened end product (greater strength values at the same specific weight, in comparison with expanded concretes that are usual nowadays). The dry raw densities correspond to those of autoclave-hardened expanded concretes. The strength values of the new expanded concrete are clearly higher than those of autoclave-hardened expanded concrete, because of the cement block matrix that was optimized in targeted manner. Air-curing mineral-bonded foams can be produced with these expanded concretes, also in conventional plants for pre-finished concrete parts and on the construction site, which the properties that are set for high-quality modern construction materials nowadays.

It is particularly advantageous if the expanded concrete has a fresh mortar consistency at the beginning of the reaction, during binding, of at least the consistency class F4 (very soft) according to DIN 1045-2. In this way, expansion of the pores is not too greatly restricted due to the stiffness of the binder paste, on the one hand, while on the other hand, the pores that form cannot rise to the surface of the expanded concrete, and thus exit from the expanded concrete, in disadvantageous manner. The fresh mortar consistency can be determined, for example, by means of standardized methods and arrangements, for example by means of determining the degree of spread according to DIN EN 12350-5 or DIN 1045-2, respectively.

With regard to the configuration of the cement block matrix, it is possible that the expanded concrete has a matrix composed of high-strength or ultra-high-strength and low-permeability concrete, preferably of so-called ultra-high-performance concrete UHPC or high-performance concrete HPC. Such ultra-high-performance or high-performance concretes are being developed for purposes of use of conventional concrete, but not of light concretes. The solution approaches available there for increasing the strength values of the cement block matrix, such as, in particular, the use of concrete additives such as, in particular, microsilica, or reducing the water proportion to a proportion of less than 40 mass-%, can bring about further improvements in the strength values of the expanded concrete, in interaction with the pore formation described, which improvements cannot be achieved with other compositions of known light concretes.

Further optimization of the strength of the expanded concrete can be achieved in that the expanded concrete has fibers for increasing the tensile strength. These fibers are mixed into the binder paste and then embed themselves into the cement block matrix of the expanded concrete, and thereby further reinforce the cement block matrix. In this connection, extensive control of this reinforcement effect by means of the fibers can be achieved by way of different fibers as well as fiber lengths and fiber thicknesses.

It is furthermore advantageous if the raw density of the expanded concrete amounts to up to 1000 kg/m$^3$. As the result of such a raw density, the expanded concrete continues to lie in weight ranges that correspond to conventional light concretes and, in particular, also to the autoclave-hardened expanded concretes, and can therefore replace such expanded concretes, also in the case of purposes of use usual for them, without any problems.

It is furthermore important that the chemical propellant, in the form of aluminum powder, for example, is added to the mixture of the expanded concrete in a completely dispersed state of the aluminum particles in the water. In this way, the result is achieved that each particle of the propellant powder actually forms an air pore that corresponds to its size, and thus the yield of pores in the expanded concrete is optimized. A very homogeneous distribution of the particles of the propellant in the binder paste, as well as dense packing of the pores in the subsequent matrix of the hardened expanded concrete, can be achieved, particularly if the particles of the chemical propellant, in the form of aluminum powder, which have a different particle size, are mixed with one another, dry, before being dispersed in water; this results in the strength advantages already described.

In this connection, it is important, in a further embodiment, that the pores of the expanded concrete are configured essentially as air pores having different pore sizes. Such air pores have significant advantages as compared with the gel pores that also form, and the capillary pores, with regard to strength optimization, since they are significantly larger than the gel pores and the capillary pores, and their formation can be better influenced. In particular, the pore size of the pores of the expanded concrete, in each instance, can be well influenced as a function of the particle size of the propellant particles, and of the fresh mortar consistency of the expanded concrete at the beginning of the binding reaction, and thus the strength values and the raw density of the expanded concrete can be controlled in targeted manner. Gel pores, on the other hand, can be influenced hardly at all by means of concrete technology, and are an integral part of the hardened cement block. Capillary pores, in turn, can be influenced by the water/cement ratio. The less water is used when batching up the binder paste, the lower the proportion of capillary pores. Capillary pores are formed when excess water is present in the cement paste, which water is not chemically reacted with the reaction partners, to form calcium silicate hydrate phases (CSH phases), during the hardening reaction (hydration).

The invention furthermore describes a method for the production of an expanded concrete composed of binder-containing mixtures, with a chemical propellant for embedding a plurality of pores into the concrete matrix, as well as concrete additives and concrete admixtures, particularly of an expanded concrete according to claim 1. In this connection, binder, concrete additives, and concrete admixtures are mixed with one another, the chemical propellant, in the form of a powder as a mixture of different particle sizes, preferably in the form of aluminum powder, is added to the mixture, in the completely dispersed state of the particles in water, and the mixture is adjusted to a fresh concrete consistency of at least the consistency class F4 (very soft) according to DIN 1045-2, at the beginning of the binding reaction, by means of adding water; afterwards, the binder paste produced in this manner is chemically expanded by the propellant, forming air pores of different sizes and essentially homogeneous distribution, and hardens under atmospheric pressure at normal ambient temperature, by means of hydration of the binder. In this way, the result is achieved that on the one hand, the pores can form in the desired size and the most homogeneous size distribution possible, within the binder paste, and on the other hand, that they are quasi-frozen in this state by means of hydration of the binder, in the state that they have achieved, and form the advantageous matrix structure of the expanded concrete. The subsequent strength properties of the expanded concrete can be controlled within broad limits by means of changing the mixture and the particle sizes of the powder propellant, whereby here, aluminum or similar gas forming agents can advantageously be used, as well as by means of influencing the consistency of the binder paste in targeted manner, at least at the beginning of expansion of the pores.

In a further embodiment, the strength of the matrix of the expanded concrete can be increased by means of reducing the water proportion to a proportion of less than 40 mass-% and/or by means of adding microsilica and/or fly ash at a proportion of 0.5-25 mass-% with reference to the mass of the binder. As a result, another possibility of influencing the properties of the expanded concrete is available, by means of influencing the composition components indicated.

The invention furthermore relates to a test method for determining the fresh concrete properties of an expanded concrete composed of binder-containing mixtures, with a chemical propellant for embedding a plurality of pores in the concrete matrix, in which method an amount of the batched-up binder paste is filled in a preferably transparent test container after it has been batched up, and the initial volume of the expanded concrete is determined, and afterwards, the volume of the expanded concrete is determined at time intervals that can be pre-determined, as it is expanded by the propellant, forming pores, until the pore formation, i.e. the expansion of the expanded concrete has been completed, whereby the initial volume and the end volume of the expanded concrete, after completion of the expansion, is calculated as a percentage of the expansion behavior of the expanded concrete. The consistency of the fresh mortar is very difficult to measure using usual methods, since the viscosity constantly changes due to the rapid progression of the reaction (20-30 min). In order to obtain information concerning the composition of the fresh mortar, which permits a conclusion concerning the strength properties, a new type of test method for determining a fresh concrete property was developed. This involves measuring the volume increase during the process of expansion, i.e. expansion of the pores. Using this test method, it is possible to make a first qualitative and quantitative statement concerning the properties of the expanded concrete to be expected, using the expansion behavior, in simple and easily reproducible manner, immediately after batching up the expanded concrete, and this allows fast inspection, also in the manner of a random sample inspection, of the expanded concrete on location, during production in the concrete block plant or also at the construction site, whereby it is advantageous if the volume of the expanded concrete, which is expanded by the propellant, forming pores, is measured at uniform time intervals. The volume increase recorded provides important information for assessing the porosity. Since the mixture composition is known, the pore volume and the pore distribution aimed at are also known, and can be compared with the values obtained from previous tests.

In particular, if a transparent PMMA container having a known, preferably round cross-section, is used as the test container, not only a simple determination of the changing volume of the expanded concrete, but also an inspection of the processes that take place during expansion of the pores, can take place, directly by looking at the sample. For example, incomplete dispersion and demixing can be observed through the transparent PMMA container. For this purpose, in a further embodiment, the expanded concrete is filled into the test container immediately after being batched up, so that the entire expansion of the expanded concrete takes place in the test container itself.

The drawing shows a particularly preferred embodiment of the expanded concrete according to the invention.

It shows.

The invention will be explained with regard to actual embodiments of the expanded concrete, using some examples of typical compositions of the expanded concrete, and the strength values achieved in this way.

Percentage amount data always relate to the amount of binder, here, the amount of cement. For example, this means: aluminum amount: 0.08% means 0.8 g Al per 1000 g cement.

EXAMPLE 1

Cement, Water, Aluminum

| Starting substances | Properties determined |
| --- | --- |
| Type of cement: CEM I 42.5 R | Raw density: 0.77 g/cm$^3$ |
| Water/cement ratio: 0.60 | Compressive strength: 9 N/mm$^2$ |
| Aluminum amount: 0.1% | |
| Average grain size of aluminum: 20-30 μm | |

EXAMPLE 2

Cement, Water, Aluminum, Silica Dust

| Starting substances | Properties determined |
|---|---|
| Type of cement: CEM I 42.5 R<br>Water/cement ratio: 0.60<br>Aluminum amount: 0.08%<br>Average grain size of<br>aluminum: 60-70 μm<br>Silica dust amount: 7% | Raw density: 0.95 g/cm³<br>Compressive strength: 12 N/mm² |
| Type of cement: CEM I 42.5 R<br>Water/cement ratio: 0.28<br>Liquefier amount: 0.4%<br>Aluminum amount: 0.08%<br>Average grain size of<br>aluminum: 60-70 μm | Raw density: 1.17 g/cm³<br>Compressive strength: 19 N/mm² |

EXAMPLE 3

Cement, Water, Aluminum, Liquefier

| Starting substances | Properties determined |
|---|---|
| Type of cement: CEM I 42.5 R<br>Water/cement ratio: 0.40<br>Liquefier amount: 1.5%<br>Aluminum amount: 0.1%<br>Average grain size of<br>aluminum: 42-50 μm<br>Silica dust amount: 10% | Raw density: 1.1 g/cm³<br>Compressive strength: 17 N/mm² |

EXAMPLE 4

Cement, Water, Aluminum, Liquefier, Silica Rust

EXAMPLE 5

Cement, Water, Aluminum, Liquefier, Silica Dust

| Starting substances | Properties determined |
|---|---|
| Type of cement: CEM I 42.5 R<br>Water/cement ratio: 0.35<br>Liquefier amount: 1.5%<br>Aluminum amount: 0.1%<br>Average grain size of<br>aluminum: 75-85 μm<br>Silica dust amount: 10% | Raw density: 1.24 g/cm³<br>Compressive strength: 23 N/mm² |

As can be seen on the basis of the different compositions and the properties determined for the corresponding samples, in each instance, the strength values and, in particular, the compressive strength of the expanded concrete according to the invention can be varied within broad limits, and they achieve values that could not be achieved with conventional matrix-pored fine-grain light concretes.

Figure 1A:
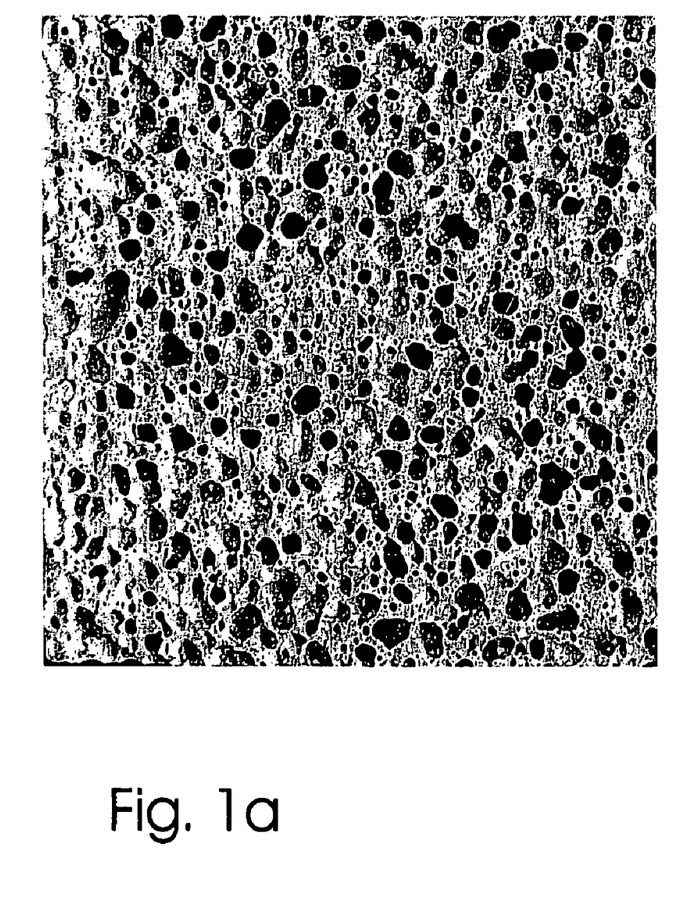
FIGS. 1a, 1b—sectional views of two exemplary samples of an expanded concrete according to the invention, FIG. 2—a schematic representation of a measurement arrangement for determining the fresh concrete properties by means of the test method according to the invention, by way of an expansion test.
Figure 1B:
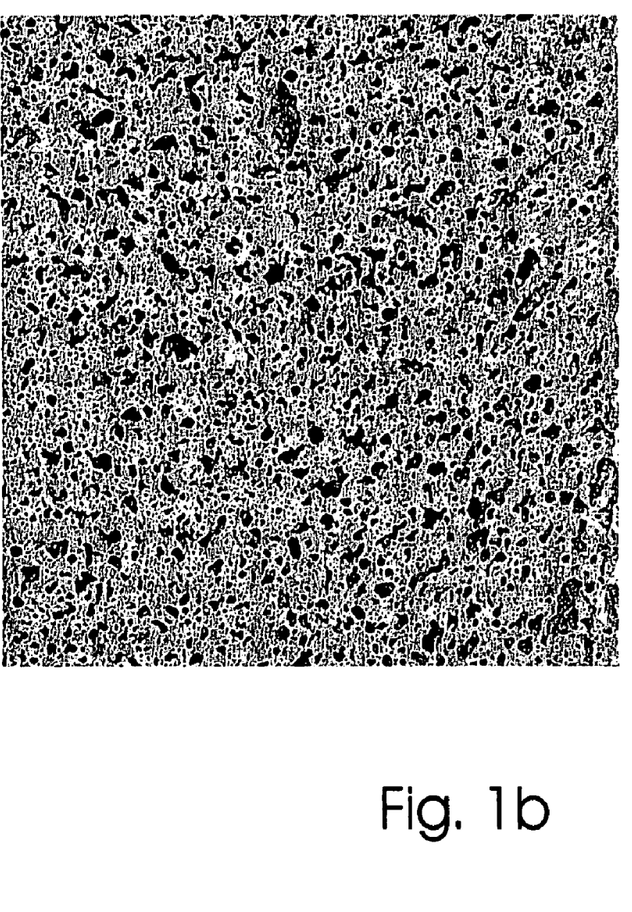

Two examples for the matrix configuration of an expanded concrete according to the invention can be seen in FIGS. 1a and 1b. Here, the expanded concrete has the following components, in each instance:

| Type of cement: | CEM I 42.5 R |
|---|---|
| FIG. 1a: | |
| Water/cement ratio: | 0.45 |
| Liquefier amount: | 1.0% |
| Aluminum amount: | 0.1% |
| Average grain size of aluminum: | 75-85 μm |
| Silica dust amount: | 5% |
| FIG. 1b | |
| Water/cement ratio: | 0.35 |
| Liquefier amount: | 1.0% |
| Aluminum amount: | 0.1% |
| Average grain size of aluminum: | 75-85 μm |
| Silica dust amount: | 5% |

As can easily be seen, the matrix shown in FIG. 1a has significantly larger pores than the matrix shown in FIG. 1b, and thus it also has a lower raw density. The distribution of the pores as well as their size distribution is essentially distributed homogeneously over the cross-section.

Figure 2:
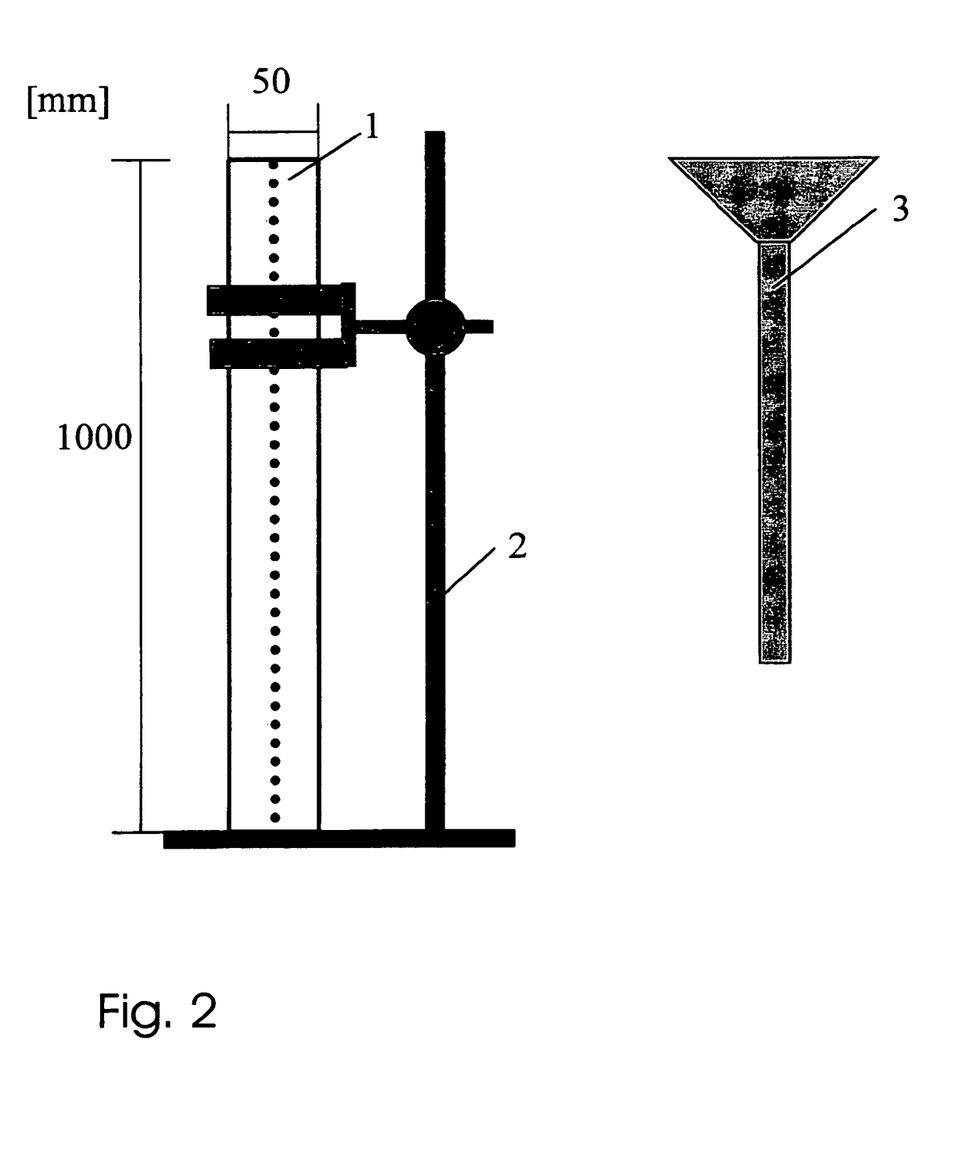

FIG. 2 very schematically shows a measurement set-up for determining the fresh concrete properties, by means of the test method according to the invention, by way of an expansion test. Immediately after the fresh concrete is mixed, it is filled into a PMMA tube 1 (e.g. diameter 50 mm), which is held in a stand 2, by means of a funnel attached to a plastic pipe 3. Immediately after the mixture is filled into the tube 1, the initial height of the mixture is read. At the time intervals listed below, the height level of the cement column is now read and recorded. The volume increase provides important information for assessing the porosity. Since the mixture composition is known, the pore volume and the pore distribution aimed at are also known, and can be compared with the values obtained from a standardized test. Incomplete dispersion and demixing can be observed through the transparent PMMA tube 1.

After batching up the fresh expanded concrete, an increase in volume is observed, due to the reaction of the propellant powder. This is followed up within the scope of this measurement, and recorded at time intervals that have already been defined in advance. Furthermore, any special characteristics over the entire course of the measurement are reproduced.

The time intervals for measurements are defined as follows, for example:

| Minute | Interval |
|---|---|
| 0.0 to 10.0 | every 30 seconds |
| 10.0 to 20.0 | every 60 seconds |
| 20.0-end of the measurement | every 5 minutes |

The volume change can be indicated on the basis of the starting level and the level readings that are read off.

$$A = \frac{h_1 \times 100}{h_0} - 100\,[\%]$$

where:

$h_1$ [cm]: height of the expanded expanded concrete $h_0$ [cm]: height of the filled-in, not yet expanded expanded concrete $A$ [%]: measure of expansion

The invention claimed is:

1. An expanded concrete comprising a mixture of:
   binders composed of Portland cement according to DIN EN 197 or of mixtures of binders that bind in a hydraulic, latently hydraulic, and/or pozzolanic reaction,
   water in a proportion of 20-60 mass % with reference to the mass of the binder in the mixture,
   chemical propellant, in the form of aluminum powder, at 0.05-0.25 mass % with reference to the mass of the binder, for the formation of air pores, whereby the aluminum powder comprises a mixture of particles having different particle sizes,
   concrete additives comprising microsilica, ground slag sand and/or fly ash, in a proportion of 0.5 to 25 mass % with reference to the mass of the binder, and
   concrete liquefiers in a proportion of 0.05-5 mass % with reference to the mass of the binder,
   wherein the expanded concrete further comprises a matrix of the mixture, the matrix having a distribution of air pores, the air pores having different sizes,
   whereby the expanded concrete has a compressive strength of up to 30 N/mm$^2$ after curing, and
   wherein the compressive strength depends on a mortar consistency of the expanded concrete and the distribution of the air pores.

2. The expanded concrete according to claim 1, wherein different sizes of the air pores correspond to the particle sizes of the chemical propellant and to the mortar consistency of the expanded concrete.

3. The expanded concrete according to claim 1, wherein the mortar consistency is determined at a beginning of binding reactions and is at least a class F4 consistency according to DIN 1045-2.

4. The expanded concrete according to claim 1, wherein the expanded concrete is an ultra-high-performance concrete or a high-performance concrete.

5. The expanded concrete according to claim 1, wherein the proportion of the water is less than 40 mass % with reference to the mass of the binder in the mixture.

6. The expanded concrete according to claim 1, wherein the expanded concrete has fibers for increasing tensile strength of the expanded concrete.

7. The expanded concrete according to claim 1, wherein a raw density of the expanded concrete is up to 1200 kg/m$^3$.

8. The expanded concrete according to claim 1, wherein the particles of the chemical propellant are added to the other components of the mixture of the expanded concrete in a uniformly mixed state in water.

9. The expanded concrete according to claim 8, wherein the expanded concrete is formed by steps of:
   mixing the first and second groups of aluminum powder grains with one another, dry, to form a powder mixture, and
   dispersing the powder mixture in the water.

10. The expanded concrete according to claim 1, wherein the pore sizes are, in each instance, dependent on the particle sizes of the chemical propellant, and wherein the mortar consistency of the expanded concrete is established at a beginning of binding reactions.

11. The expanded concrete according to claim 1, wherein the distribution of the air pores of the expanded concrete is established as a function of:
   the mixture of the chemical propellant, and
   a distribution of the particles of the chemical propellant in the expanded concrete.

12. The expanded concrete according to claim 1, wherein differently-sized pores of the air pores are uniformly distributed within the matrix of the expanded concrete.

13. A method for production of an expanded concrete, the method comprising steps of:
   mixing binder, concrete additives, and concrete liquefiers with one another, to form a binder-containing mixture having binders composed of Portland cement according to DIN EN 197 or of mixtures of binders that bind in a hydraulic, latently hydraulic and/or pozzolanic reaction, wherein the concrete additives comprise microsilica, ground slag sand and/or fly ash, in a proportion of 0.5 to 25 mass % with reference to the mass of the binder and the concrete liquefiers are present in a proportion of 0.05-5 mass % with reference to the mass of the binder,
   adding to the binder-containing mixture a chemical propellant, in the form of an aluminum powder at 0.05-0.25 mass % with reference to the mass of the binder for the formation of air pores, whereby the aluminum powder comprises a mixture of aluminum particles having different particle sizes, the aluminum particles having different particle sizes being completely dispersed with one another in water before being added to the binder-containing mixture, and
   adjusting the mixture to a concrete consistency of at least the consistency class F4 according to DIN 1045-2, at a beginning of binding reactions in the binder-containing mixture, by adding water,
   wherein the expanded concrete produced in this manner is chemically expanded by the chemical propellant, forming air pores of different sizes and of homogeneous distribution, and hardens under atmospheric pressure at ambient temperature, by hydration of the binder,
   wherein the expanded concrete comprises a matrix having a distribution of air pores, the air pores having different sizes,
   wherein the expanded concrete has a compressive strength of up to 30 N/mm$^2$ after curing, and
   wherein the compressive strength of the expanded concrete depends on a mortar consistency of the expanded concrete and on the distribution of the air pores.

14. The method according to claim 13, wherein a water proportion of the expanded concrete is less than 40 mass %.

15. The expanded concrete according to claim 1, wherein the hardening of the expanded concrete includes curing of the expanded concrete in air under atmospheric pressure and ambient temperature.

* * * * *

UNITED STATES PATENT AND TRADEMARK OFFICE
CERTIFICATE OF CORRECTION

PATENT NO.       : 8,361,219 B2                                              Page 1 of 1
APPLICATION NO.  : 12/311198
DATED            : January 29, 2013
INVENTOR(S)      : Just et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 240 days.

Signed and Sealed this
First Day of September, 2015

Michelle K. Lee
*Director of the United States Patent and Trademark Office*